United States Patent
Ford

(10) Patent No.: US 6,792,799 B2
(45) Date of Patent: Sep. 21, 2004

(54) POSITIVE FLOW METER

(76) Inventor: Michael Brent Ford, 2716 Rio Vista, St. George, UT (US) 84790

(*) Notice: Subject to any disclaimer, the term of this patent is extended or adjusted under 35 U.S.C. 154(b) by 0 days.

(21) Appl. No.: 10/122,877

(22) Filed: Apr. 11, 2002

(65) Prior Publication Data

US 2003/0192377 A1 Oct. 16, 2003

(51) Int. Cl.⁷ .................................................. G01F 1/37
(52) U.S. Cl. ...................................... 73/202; 73/861.52
(58) Field of Search .............................. 73/202, 204.22, 73/204.25, 195, 861.52, 861.53, 861.55, 861.56, 861.57; 210/143

(56) References Cited

U.S. PATENT DOCUMENTS

| | | | | |
|---|---|---|---|---|
| 341,515 A | * | 5/1886 | Spooner | 73/203 |
| 3,603,148 A | * | 9/1971 | Rikuta | 73/861.55 |
| 4,194,394 A | * | 3/1980 | Bartholomaus | 73/861.54 |
| 4,486,744 A | * | 12/1984 | Pratt et al. | 73/861.56 |
| 4,522,077 A | * | 6/1985 | Koberle | 73/861.63 |
| 4,581,944 A | * | 4/1986 | Obermann et al. | 73/861.47 |
| 5,033,311 A | * | 7/1991 | Custer | 73/861.53 |
| 5,079,943 A | * | 1/1992 | Custer | 73/861.53 |
| 5,086,654 A | * | 2/1992 | Malminen | 73/861.58 |
| 5,379,651 A | * | 1/1995 | Doolittle | 73/861.56 |
| 5,419,203 A | * | 5/1995 | Carmichael | 73/861.58 |
| 5,533,549 A | * | 7/1996 | Sherman | 73/861.63 |
| 5,544,533 A | * | 8/1996 | Sugi et al. | 73/861.56 |
| 5,554,805 A | * | 9/1996 | Bahrton | 73/202 |
| 5,747,702 A | * | 5/1998 | Kadlicko | 73/861.53 |
| 5,820,715 A | * | 10/1998 | Singleterry et al. | 156/73.1 |
| 5,905,200 A | * | 5/1999 | Eldridge et al. | 73/202 |
| 6,338,279 B1 | * | 1/2002 | Tsataros | 73/861.56 |
| 6,349,603 B1 | * | 2/2002 | Spiess | 73/861.55 |
| 6,406,618 B1 | * | 6/2002 | O'Leary | 210/143 |
| 2002/0104387 A1 | * | 8/2002 | Schimnowski et al. | 73/861.53 |

* cited by examiner

Primary Examiner—Harshad Patel
(74) Attorney, Agent, or Firm—Andrew M. Harris; Harry M. Weiss; Weiss, Moy & Harris, P.C.

(57) ABSTRACT

A flow meter and electrically operable valve assembly having integral flow meters provide detection of very low water flows, along with ease of installation and compact packaging for a water supply control system. The flow detection is particularly useful for systems that control household water supplies to prevent flooding, but is also useful in other applications such as agricultural and industrial systems where low water flow rates must be determined. All of the controls and features are integrable within a compact package that occupies essentially the same volume and piping space as a conventional electrically operable valve.

12 Claims, 3 Drawing Sheets

POSITIVE FLOW METER

CROSS REFERENCE TO RELATED APPLICATIONS

The present application is related to concurrently filed U.S. patent applications: No. 10/122,880 entitled "METHOD AND SYSTEM FOR CONTROLLING A HOUSEHOLD WATER SUPPLY" and No. 10/122,879 entitled "ELECTRICALLY OPERABLE VALVE ASSEMBLY HAVING AN INTEGRAL PRESSURE REGULATOR", the specifications of which are herein incorporated by reference.

BACKGROUND OF THE INVENTION

1. Field of the Invention

The present invention relates generally to liquid flow meters, and more specifically, to a positive flow meter for incorporation within an electrically operable valve assembly for controlling a water supply.

2. Background of the Invention

Water supply control systems for household use generally require a measure of water flow, so that water leaks may be detected. Typical flow meters use a paddle or other device inserted into the liquid flow. Displacement of the paddle against a restoring force provides a linear or angular measurement of the flow amount. However, paddle type flow meters generally cannot measure the low flow rates associated with slow water leaks.

A water supply control system also generally requires an electrically operable valve to control water flow and other devices such as a pressure regulator and backflow preventor. The combination of all of these devices along with a flow meter makes a very large in-line installation in a typical water supply control system and requires a number of connections, each that may be susceptible to failure. Assembly time is also increased when the devices used are discretely installed in-line.

Therefore, it would be desirable to provide a flow meter for measuring low flow rates associated with small leaks. It would further be desirable to provide a flow meter that may be integrated with other devices such as electrically controllable valves, backflow preventors and pressure regulators, whereby fewer interconnects, smaller in-line installation space and less assembly time is required.

SUMMARY OF THE INVENTION

The above objective of providing a flow meter for measuring low flow rates that does not require additional in-line space, additional interconnects and assembly time is achieved in a positive flow meter that may be constructed integral to an electrically controllable valve, pressure regulator and backflow preventor. The water system control device and flow meter are thus incorporated within one housing.

The positive flow meter is integrated in a water control system valve or backflow preventor that include a main chamber and a bypass channel. A movable indicator is disposed within the bypass channel and a position sensor is located near the bypass channel so that the position of the movable indicator is detectable via the sensor. The flow meter may further be integrated with a backflow preventor having a flow resisting element and a position sensor located near the flow resisting element so that a position of the flow resisting element may be detected to provide a measure of flow in the forward direction. A combination of sensors may be used on the flow resisting element and the bypass channel indicator to provide a high flow/low flow indication.

The foregoing and other objectives, features, and advantages of the invention will be apparent from the following, more particular, description of the preferred embodiment of the invention, as illustrated in the accompanying drawings.

DETAILED DESCRIPTION OF THE PREFERRED EMBODIMENTS

1. Electrically Operable Valve

Figure 1:
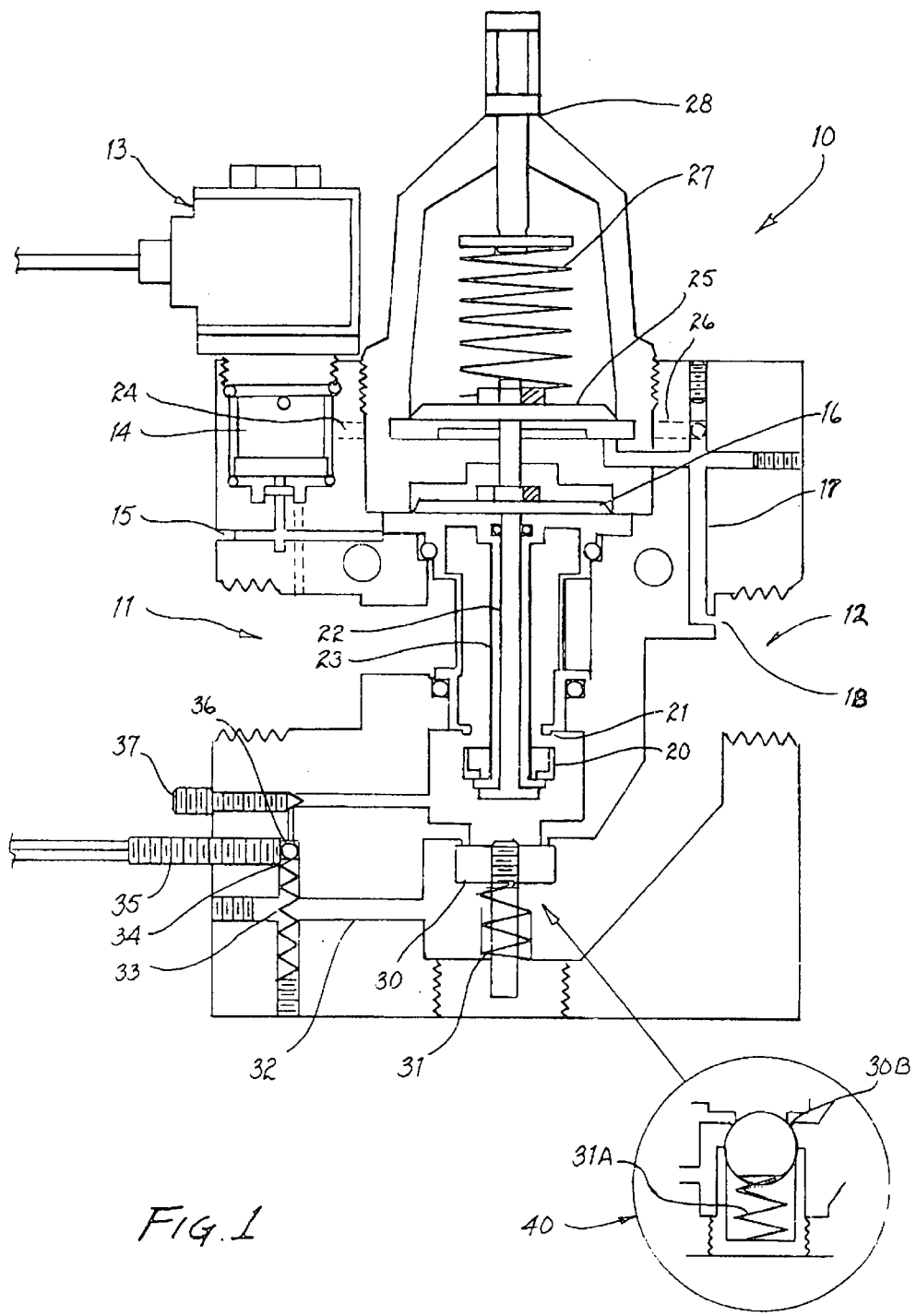
FIG. 1 is a mechanical drawing depicting a cross-section of an electrically operable valve assembly incorporating a flow meter in accordance with an embodiment of the invention.

Referring now to the figures and in particular to FIG. 1, an electrically operable valve assembly 10 in accordance with an embodiment of the present invention is depicted. A water supply inlet 11 provides a connection to a water supply system such as a city water main connection. A household water supply outlet 12 provides connection to a household water supply system. In the depicted embodiment, electrically operable valve assembly 10 includes a backflow preventor, which prevents any backflow of water to the water supply. The backflow preventor comprises a piston 30 and spring 31 that prevent the flow of water when back water pressure moves piston 30 upward, relieving the compression of spring 31. Alternatively, as shown in balloon 40, a ball 30B may be used in place of piston 30, with the ball mounted above a spring 31A. The backflow preventor device is closely coupled to the operation of an integral flow meter, which will be described in further detail below. The backflow preventor device is closely coupled to the operation of an integral flow meter, which will be described in further detail below.

Figure 2:
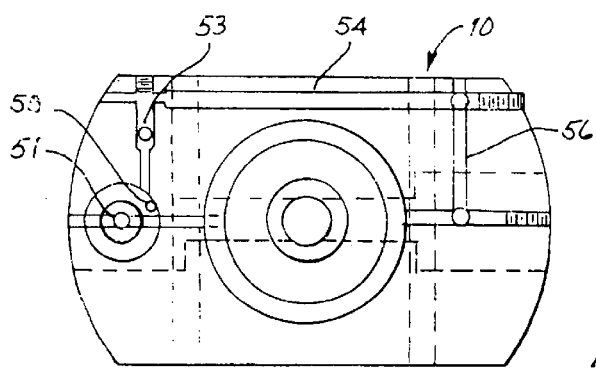
FIG. 2 is a mechanical drawing depicting a top view of the electrically operable valve assembly of FIG. 1.

Control of electrically operable valve assembly 10 is provided by a piston-mounted gasket assembly 20 that shuts off the main water channel from water supply inlet 11 to household water supply outlet 12. Gasket assembly 20 is slidably mounted on an outer piston 23 that surrounds an inner piston 22. Outer piston 23 is mechanically coupled to a lower diaphram 16. Electrically operable valve assembly is closed by water pressure on the lower side of lower diaphram 16 causing outer piston 23 to move gasket assembly 20 to force the gasket against seat 21. The water pressure on the lower side of lower diaphram 16 is supplied by a channel 15 that receives flow when a piston 14 coupled to electrical solenoid 13 is in the raised position. Referring momentarily to FIG. 2, channel 15 receives flow from central aperture 51 which in turn receives flow from peripheral aperture 55 when piston 14 is raised (an o-ring or washer is provided at the end of piston 14 to provide a seal). Peripheral aperture 55 is coupled to water supply inlet 11 and thus provides a source of pressure higher than household water supply outlet 12.

Since the only path to the lower side of lower diaphram 16 is provided through channel 15, when piston 14 is lowered, water pressure must be relieved through channel 15 to open electrically operable valve 10. Piston 14 is hollow, and provides a connection from channel 15 (via central aperture 51 of FIG. 2) to a side port channel 24 that extends around the diaphram assemblies and connects to an exit channel 26 on the outlet side 12 of electrically operable valve 10. Referring to FIG. 2, the path of channel 24 connects through channels 54 and 56 to channel 17 and venturi 18 of FIG. 1. Flow in the main channel of electrically operable valve 10 causes a reduced pressure at venturi 18, pulling water through the above-described path from the top side of lower diaphram 16 as the valve closes. A stop ball 53 disposed within channel 54 prevents backflow through this path.

Solenoid 13 may be a latching-type solenoid, permitting a momentary pulse to operate electrically operable valve assembly 10. A latching solenoid is preferred for extending solenoid life and for reducing power consumption and noise, but a standard solenoid may be preferred if it is desirable to cut-off water flow when electrical supply to the assembly fails.

2. Pressure Regulator

Upper diaphram 25 provides a pressure regulator integrated within electrically operable valve assembly 10. A channel 17 connects to a venturi 18 that couples the household water outlet side 12 of electrically operable valve assembly 10 to the lower side of upper diaphram 25. The pressure supplied through channel 17 to upper diaphram 25 acts against spring 27 that is manually adjustable via turnscrew 28. When the outlet pressure exceeds a level as set by turnscrew 28 adjustment, upper diaphram 25 lifts inner piston 22, raising gasket assembly 20, restricting the flow through the main channel of electrically operable valve assembly 10. Thus, a pressure feedback mechanism is established that regulates the pressure at outlet 12.

3. Flow Meter

A flow meter may be implemented within electrically operable valve assembly 10 by a sensor 35 mounted near bypass channel 32 inlet. A ball 34 is mounted within bypass channel 32 and may be made of a magnetized material or ferromagnetic material for use with a hall effect sensor. Sensor 35 may be a hall effect sensor, inductive sensor or other suitable sensor for detecting the proximity of ball 34. The output indication from sensor 35 may be a continuous analog reading of the position of ball 34, or a binary flow/no-flow indication.

The flow meter implemented by ball 34 and sensor 35 is a positive flow meter in that any flow through valve assembly 10 will move ball 34 away from sensor 35, providing measurement of flows much lower than flow rates detectable with conventional flow meters for household water supply applications, which typically cannot detect flows below 0.5 gallons per minute. The positive flow meter permits detection of low volume water leaks that may cause damage to a structure without registering a flow at a flow meter detection system. Since any flow through valve assembly 10 requires a pressure drop between water supply inlet 11 and household water supply outlet 12, ball 34 will move away from sensor 35 as flow through bypass channel 32. Spring 33 has a very low spring constant and very little force on ball 34 is required to compress spring 33. When no flow (or back flow begins to occur), ball 34 will be forced by spring 33 against seat 36, effectively closing bypass channel 32 to prevent backflow leakage. Setscrew 37 permits adjustment of the cross-section of bypass channel 32, providing a means for adjusting the sensitivity of the flow meter at the factory or after installation. As the channel cross-section decreases, the amount of force compressing spring 33 for a given flow rate will increase, thus increasing the sensitivity of the flow meter.

Spring 31 is designed so that gasket assembly 30 will not open the main valve channel until the sensor 35 detects positive flow and therefore any flow through electrically operable valve assembly 10 will result in an indication from sensor 35. The above operation is accomplished by making the spring constant of spring 31 such that ball 34 will travel past sensor 35 before spring 31 is compressed to open the main valve channel.

4. Alternative Electrically Operable Valve and Flow Meter

Figure 3:
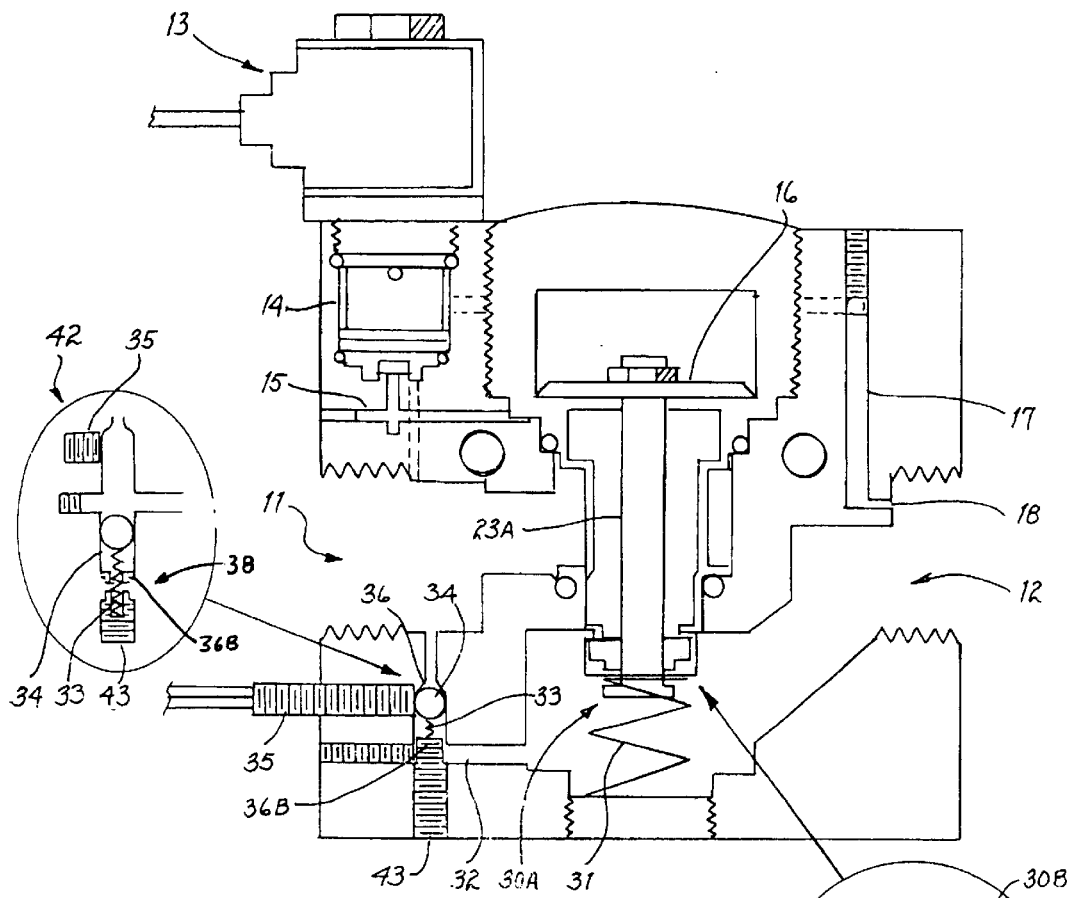
FIG. 3 is a mechanical drawing depicting a cross-section of an electrically operable valve assembly incorporating a flow meter in accordance with an alternative embodiment of the invention.

Referring now to FIG. 3, an electrically operable valve and flow meter in accordance with an alternative embodiment of the invention is depicted. In this embodiment, the pressure regulator is removed from the embodiment depicted in FIGS. 1 and 2, simplifying the structure of the assembly. In the depiction, like reference numbers are used to indicate the corresponding components, the operation of which is described above for the embodiment of FIGS. 1 and 2. Therefore, only differences between the assemblies will be described.

Piston 23A is a single sleeve piston operating in similar fashion to outer piston 23 of FIG. 1. Piston 23A does not have to be hollow, as inner piston 22 of FIG. 1 was provided to implement pressure regulation and is therefore not needed in the present embodiment. Piston 23A is slidably coupled to gasket assembly 30A, which is operated by diaphram 16 or backpressure from water supply outlet 12, eliminating the need for the separate piston 30 or gasket assembly 20 of FIG. 1. The sliding mount of gasket assembly 30A in conjunction with spring 31 provides closure of the main channel at the onset of flow until ball 34 has seated against seat 36, providing proper operation of the flow meter within the bypass channel. However, since forward pressure can be applied through channel 32 when the valve is closed (channel 32 in the embodiment of FIG. 1 is effectively closed by gasket assembly 20 when the valve is closed), a second seat 36B is provided for ball 34 in the reverse flow direction, preventing leakage through the flow meter channel 32 when the valve is closed. The bottom of seat 363 is provided by a threaded insert 43 in the depicted embodiment. In order for ball 34 to move when a forward flow is generated through the valve assembly, water must flow channel 32. Forward flow is provided by a channel passing through threaded insert 43. Balloon detail 42 depicts the above-described channel 38 that is cross-drilled through threaded insert 43 to connect with the hole that is drilled to retain spring 33. When the valve is closed, water can flow through channel 38 from the center of spring 33, until ball 34 seats at bottom seat 36B.

5. Alternative Embodiment—Backflow preventor with Flow Meter

Figure 4:
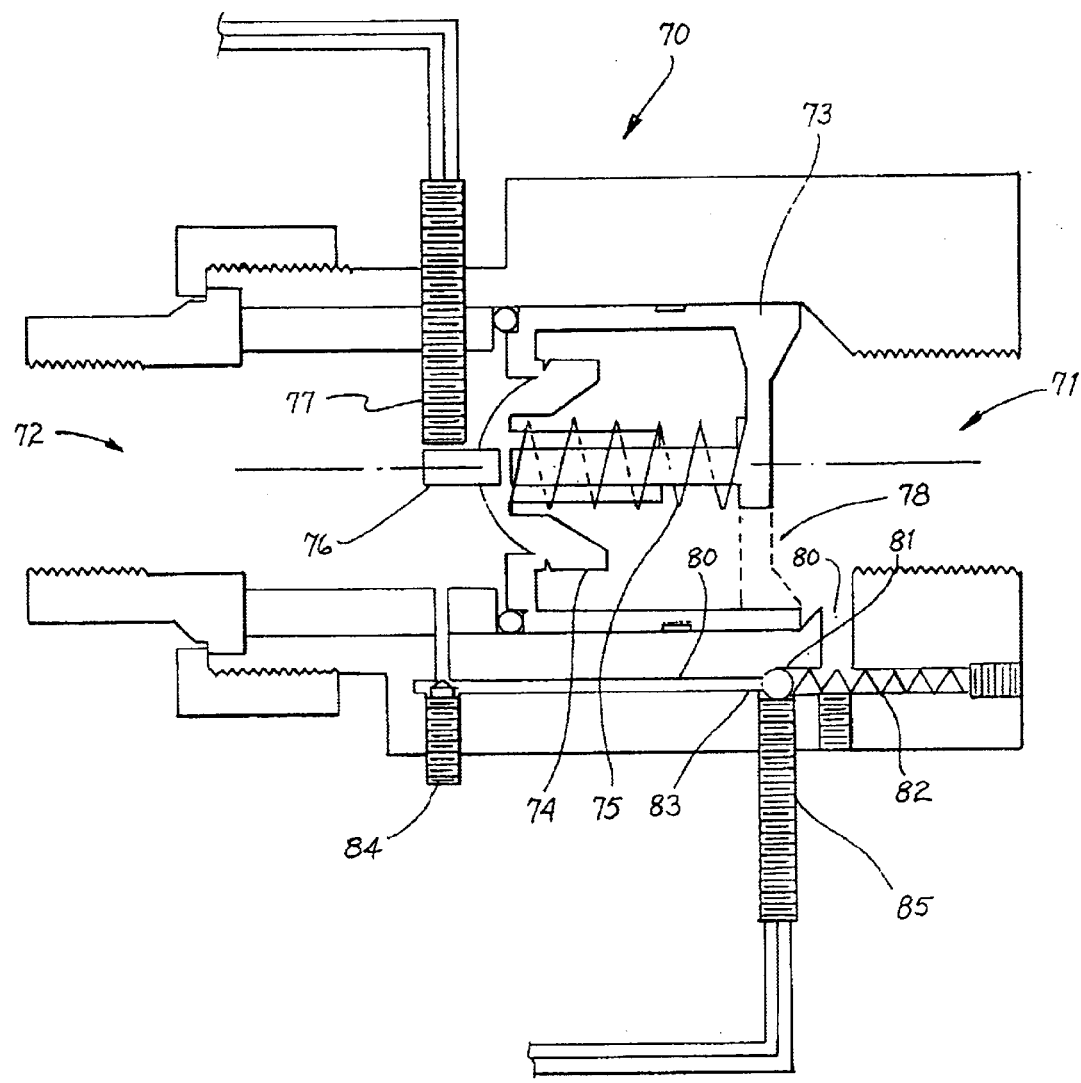
FIG. 4 is a mechanical drawing depicting a cross-section of a backflow preventer incorporating a flow meter in accordance with an alternative embodiment of the invention.

Referring now to FIG. 4, a backflow preventor 70 in accordance with an alternative embodiment of the invention is depicted. Backflow preventor includes a water supply inlet 72 and a water supply outlet 71 for coupling the backflow preventor to an electrically operable valve for control of a household water supply. A plunger 74 is slidably mounted on a piston assembly 73 which includes vanes 72 that permit the passage of water beyond piston assembly 73. A spring 75 pushes plunger 74 against a seat, preventing flow of water from water supply outlet 71 to water supply inlet 72. Flow from water supply inlet 72 to water supply outlet 71 compresses spring 75 and spring 75 can be designed to provide pressure reduction from water supply inlet 72 to water supply outlet 71 if desirable for a particular application.

A flow meter is integrated within backflow preventor 70 by a ball 81 and sensor 85 which operate and are constructed as described above for the flow meter incorporated within the electrically operable valve asembly 10 of FIG. 1. Spring 82 is compressed by flow through channel 80 and the spring constant of spring 82 is specified so that ball 81 will move away from sensor 85 at a flow rate lower than that required to move plunger 74. A seat 83 prevents backflow through channel 80 and a setscrew 84 provides adjustment of the cross section of bypass channel 80, permitting adjustment of the flow meter sensitivity.

A second flow meter may be incorporated within backflow preventer 70 by incorporating a movable indicator 76 on the end of plunger 74 and detecting the position of movable indicator 76 with a second sensor 77. Since ball 81 will move at flow rates lower than those required to move moveable indicator 76, sensor 77 is a "high flow" indicator with respect to sensor 85, which may provide a failure indication if sensor 85 is inactive when sensor 77 provides an indication of flow. Or, sensor 85 and sensor 77 may be used within a household water control system to provide indication of various levels of flow. For example, a dripping faucet will activate sensor 85, but will probably not activate sensor 77, while a major plumbing leak will activate both.

The embodiments of the invention described above disclose an electrically operable valve with pressure regulation incorporated within one housing and using common mechanisms between the valve and pressure regulator. In the alternative embodiment, backflow prevention and flow rate indication are corporated also within a common housing. Both embodiments provide a flow meter capable of registering very low flow rates, so that household leak detection may be accomplished for very low flow rate leaks. The valve is suitable for use within the system and method described in the above-incorporated patent application "METHOD AND SYSTEM FOR CONTROLLING A HOUSEHOLD WATER SUPPLY", wherein the valve will provide a compact solution having very high sensitivity to water supply system leaks.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A flow meter integrated within a liquid system control device including a primary flow resisting mechanism disposed within a primary channel of said liquid system control device and a bypass channel around said primary channel and said primary flow resisting mechanism, said flow meter comprising:

a movable indicator disposed within said bypass channel, for detecting flow through said bypass channel, wherein said primary flow resisting element of said liquid system control device is a movable flow resisting mechanism having a blocking position that blocks flow through said primary channel at low levels of forward pressure differential across said primary flow resisting mechanism so that forward flows lower than a level of flow required to move said primary flow resisting mechanism from said blocking position occur entirely through said bypass channel, and wherein said movable indicator prevents any flow through said bypass channel from bypassing said movable indicator, whereby said movable indicator moves with any forward flow occurring through said liquid system control device; and a detector for detecting a position of said movable indicator, whereby any forward flow through said liquid system control device that moves said movable indicator to a detection threshold of said detector is detected, which indicates a leakage through said liquid system control device.

2. The flow meter of claim 1, further comprising a bypass flow resisting mechanism contacting said moveable indicator when said flow occurs, whereby displacement of said bypass flow resisting mechanism is proportional to a force produced by flow through said bypass channel.

3. The flow meter of claim 1, wherein said movable indicator comprises a ball within said bypass channel, and wherein said bypass channel defines a chamber having a diameter larger than a diameter of said ball wherein said ball may move.

4. The flow meter of claim 1, wherein said detector is a detector for detecting the proximity of a material having magnetic properties, and wherein said movable indicator is made from a material having magnetic properties.

5. The flow meter of claim 1, wherein said liquid system control device is an electrically operable valve assembly including an electrically operable valve comprising said primary flow resisting mechanism disposed between a water supply inlet and a household water supply outlet and said bypass channel leading from said water supply inlet to said household water supply outlet.

6. The flow meter of claim 1, wherein said liquid system control device is an electrically operable valve assembly including an electrically operable valve comprising said primary flow resisting mechanism disposed between an internal chamber and a household water supply outlet and said bypass channel leading from said internal chamber to said household water supply outlet.

7. The flow meter of claim 1, wherein said liquid system control device is a backflow preventor.

8. The flow meter of claim 1, wherein said detector is an analog detector determining a continuous position of said movable indicator.

9. The flow meter of claim 1, wherein said detector is a binary detector determining that a position of said moveable indicator has exceeded a predetermined position.

10. The flow meter of claim 1, wherein said flow resisting element of said liquid system control device is a movable flow resisting element having a backflow-preventing position that blocks reverse flow through said main channel, and wherein said movable indicator cooperates with said bypass channel to prevent reverse leakage through said bypass channel when said movable indicator is seated at a reverse flow position.

11. The flow meter of claim 1, and wherein said movable indicator cooperates with said bypass channel at a maximum forward flow position to block flow through said bypass channel, whereby said movable indicator is maintained at said maximum forward flow position when position when said flow resisting element is open.

12. The flow meter of claim 1, wherein said flow resisting element includes a force-producing element having a first predetermined spring constant, wherein said movable indicator includes a second force-producing element having a second predetermined spring constant, and wherein said first and second predetermined spring constants are proportioned such that said second force-producing element is compressed prior to said first force-producing element, whereby said movable indicator is moved by flows less that a flow required to move said flow resisting element from said blocking position, whereby any amount of forward flow through said flow meter is detected.

* * * * *